(12) United States Patent
Quertelet et al.

(10) Patent No.: US 7,708,491 B2
(45) Date of Patent: May 4, 2010

(54) SPLICE BAR FOR CONNECTING CABLE TRAY SECTIONS

(75) Inventors: Stephane Quertelet, Remy (FR); Thomas Pareux, Antheuil-Portes (FR)

(73) Assignee: I.C.M. Group, Montbard (FR)

( * ) Notice: Subject to any disclaimer, the term of this patent is extended or adjusted under 35 U.S.C. 154(b) by 0 days.

(21) Appl. No.: 11/995,551

(22) PCT Filed: Jul. 10, 2006

(86) PCT No.: PCT/FR2006/001674

§ 371 (c)(1),
(2), (4) Date: May 27, 2008

(87) PCT Pub. No.: WO2007/006961

PCT Pub. Date: Jan. 18, 2007

(65) Prior Publication Data

US 2009/0116902 A1  May 7, 2009

(30) Foreign Application Priority Data

Jul. 12, 2005  (FR)  ................................. 05 07440

(51) Int. Cl.
*F16B 7/04* (2006.01)

(52) U.S. Cl. .................. 403/346; 174/19; 174/481; 403/391

(58) Field of Classification Search .................. 403/346, 403/396; 174/480, 481, 135, 19; 248/49, 248/300; 211/106, 106.01, 187
See application file for complete search history.

(56) References Cited

U.S. PATENT DOCUMENTS

| 5,384,937 | A  | * | 1/1995  | Simon ........................ 24/295 |
| 6,402,418 | B1 | * | 6/2002  | Durin et al. ................. 403/329 |
| 6,590,154 | B1 | * | 7/2003  | Badey et al. ................ 174/480 |
| 7,452,157 | B2 | * | 11/2008 | Deciry ....................... 403/396 |
| 7,468,491 | B2 | * | 12/2008 | Deciry et al. ............... 174/480 |
| 7,476,801 | B1 | * | 1/2009  | Davis et al. ................. 174/481 |
| 2005/0063775 | A1 | * | 3/2005 | Boltz ......................... 403/397 |
| 2006/0249300 | A1 | * | 11/2006 | Penichon ..................... 174/135 |
| 2007/0164181 | A1 |   | 7/2007 | Deciry et al. |
| 2008/0179089 | A1 | * | 7/2008 | Deciry et al. ............. 174/84 R |

FOREIGN PATENT DOCUMENTS

FR  2 857 792  1/2005
FR  2 864 361  6/2005

* cited by examiner

Primary Examiner—Daniel P Stodola
Assistant Examiner—Joshua T Kennedy
(74) Attorney, Agent, or Firm—Young & Thompson

(57) ABSTRACT

The invention concerns a splice bar for connecting two abutting sections of said cable tray, each cable tray section comprising longitudinal warp yarns and transverse weft yarns connecting the warp yarns. It comprises: an elongated central part (2) having two transverse support zones (18), designed each to receive one weft yarn; two anvil lugs (4) connected to the central part (2) on the same side thereof and arranged on either side of the transverse support zones (18); and two locking lugs (6) connected to the central part (2) on the side opposite to the anvil lugs (4) and arranged on either side of the transverse support zones (18).

9 Claims, 3 Drawing Sheets

SPLICE BAR FOR CONNECTING CABLE TRAY SECTIONS

FIELD OF THE INVENTION

The present invention concerns a connecting splice bar for cable trays.

The field of the invention is splicing wire cable tray sections. Cable trays are used to support, house and protect elongate members that are generally flexible such as electrical cables but equally tubes, for example pneumatic or hydraulic hoses. In the remainder of the present description, for reasons of simplicity and clarity, only electrical cables are referred to. The invention nevertheless applies to any other type of elongate members such as those referred to above or others such as optical fibers, etc.

BACKGROUND OF THE INVENTION

A wire cable tray generally has an elongate shape and a U-shaped section. It includes longitudinal wires, called warp wires, and transverse wires, called weft wires. The warp wires are generally straight and the weft wires U-shaped. All these wires are welded to each other so that they are regularly spaced. This produces a wire cable tray having a meshed structure that includes a bottom for supporting electrical cables (or the like) and side walls, or flanges, intended to retain the electrical cables on the bottom by forming a trough.

A cable tray generally comprises a number of sections assembled end-to-end or at an angle to each other or to produce a T, X, Y or other junction. Using connecting devices commonly referred to as splice bars to connect a number of sections together is known in the art.

The splice bars most widely used are for producing a screwed-together assembly of two cable tray sections. A connecting part is placed on the outside of the cable tray and another on the inside, and these two connecting parts hold two end weft wires sandwiched between them thanks to a screw connecting the two parts.

There are also splice bars that are easier to fit. They are fitted by means of a screwdriver, but this is used only to bend a retaining tongue. The document EP-1360749 discloses one such splice bar, for example. Such splice bars are intended to be mounted on the lateral flanges of a wire cable tray. They are not adapted to be used for the bottom of a cable tray. Note that for cable trays supporting a heavy load, it is necessary to splice two adjacent sections at the level of the bottom of the cable tray. Because of bending of the cable trays under the load represented by the cables, it is necessary to secure the bottom of the cable tray at the level of the connection between two cable tray sections. In such cases, it is necessary to use splice bars fitted by means of screws to the bottom of a cable tray.

SUMMARY OF THE INVENTION

An object of the present invention is to provide a splice bar more particularly intended for splicing the bottoms of cable tray sections without using screws and preferably without using tools.

To this end, the present invention proposes a connecting splice bar for wire cable trays, for connecting two wire cable tray sections placed end-to-end, each cable tray section including longitudinal warp wires and transverse weft wires connecting the warp wires.

According to the invention, this splice bar includes:
an elongate central part having two transverse bearing areas each adapted to receive one weft wire,
two bearing lugs attached to the central part on the same side thereof and disposed on respective opposite sides of the transverse bearing areas, and
two locking lugs attached to the central part on the side opposite the bearing lugs and disposed on respective opposite sides of the transverse bearing areas.

This kind of splice bar can be fitted to the bottom of a cable tray, for example, and connect two sections of that cable tray. The central part straddles the two sections to be connected and the end weft wires of those two sections locate in the bearing areas provided for this purpose in the central part. After fitting, each bearing lug and each locking lug bears on a warp wire. The splice bar is retained on the cable tray by means of the locking lugs.

In a preferred embodiment, the elongate central part of the splice bar is a profiled area having a U-shaped cross section with a bottom and two lateral branches. This kind of profiled shape makes the central part rigid. In this embodiment, the transverse bearing areas consist of notches in the lateral branches, for example. These notches advantageously have dimensions such that they can receive (end) weft wires of various diameters.

To facilitate manual fitting of the splice bar when connecting two cable tray sections, at least one bearing lug is advantageously extended by a rim extending perpendicularly to the free end of the bearing lug.

The dimensions of the connecting splice bar according to the invention are adapted to the dimensions of the cable tray for which the splice bar is intended. Accordingly, the width of the splice bar measured transversely from a free end of a bearing lug to the free end of a locking lug is greater than the distance between two warp wires of the cable tray, for example.

To increase the stiffness of the splice bar, in particular when fitting or removing it, for a given thickness of plate, the central part advantageously includes stiffener bosses.

A connecting splice bar according to the invention is advantageously such that its central part includes fixing means, such as an oblong hole, to receive an accessory. Thus a light fitting, a junction box, etc. can be fitted to the splice bar.

In a preferred embodiment, each locking lug includes a boss to be clipped onto a warp wire of the cable tray and the free end of each locking lug is inclined to encourage passage of the boss over a warp wire during clipping. In this preferred embodiment, the locking lug can also be called a clipping lug.

A splice bar as described hereinabove can be made by cutting and bending a galvanized metal plate, for example.

BRIEF DESCRIPTION OF THE DRAWINGS

Details and advantages of the present invention will emerge more clearly from the following description with reference to the appended diagrammatic drawings, in which.

DETAILED DESCRIPTION OF EMBODIMENTS

Figure 1:
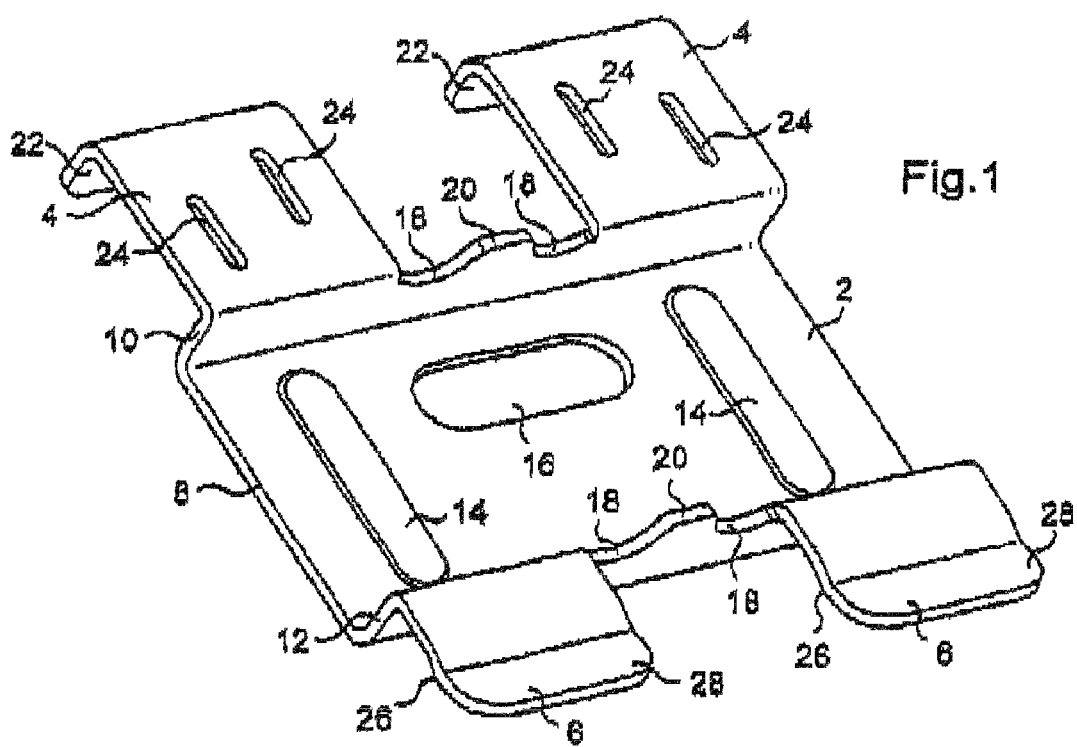
FIG. 1 represents a splice bar according to the intention shown in perspective.

The drawings represent a preferred embodiment of a connecting splice bar according to the invention. FIG. 1 is a perspective view of this kind of splice bar on its own (the other figures show the same splice bar positioned relative to cable tray sections).

As can be seen in FIG. 1, the splice bar shown is made from a metal plate (for example a galvanized steel plate) cut and bent to shape. This splice bar has a central part 2 having a profiled shape of U-shaped cross section, from which extend from one side two bearing lugs 4 and from another side two locking lugs 6 referred to hereinafter as clipping lugs.

As indicated hereinabove, the central part 2 is a profiled portion with a U-shaped cross section. It therefore has a bottom 8, a first lateral branch 10 and a second lateral branch 12.

Here the bottom 8 has a rectangular shape. That shape appears to be the most suitable here, but other shapes, preferably with two parallel opposite edges, can also be envisaged in a splice bar according to the invention. The central part 2 is not necessarily profiled and the bottom 8 can have any shape. Compared to the profiled central part, in the embodiment shown, the two longer sides of the bottom 8 extend longitudinally and each corresponds to one lateral branch.

The bottom 8 includes two stiffeners 14 and an oblong hole 16. The stiffeners 14 are bosses produced in the bottom 8 and extending transversely. The presence of these stiffeners means that the splice bar concerned can be produced from a thinner plate than a splice bar having no such stiffeners but has the same stiffness. The oblong hole 16 extends longitudinally and can be used to receive an accessory, such as a light fitting or a junction box, for example.

The first lateral branch 10 extends perpendicularly to the bottom 8 over its full length. At each end, the first lateral branch carries a bearing lug 4. At the center, the first lateral branch 10 has, on the side opposite the bottom 8, two notches 18 separated by a spacing tongue 20. As explained hereinafter, these notches 18 are intended to serve as a bearing and housing area for end weft wires of two cable tray sections. Their shape and their size are matched to the circular section and to the diameter(s) of the weft wires that they are to receive.

Each bearing lug 4 extends from the edge of the first lateral branch 10 toward the exterior of the central part 2 and substantially parallel to the bottom 8. The free end of each bearing lug 4, opposite the first lateral branch 10, is curved downward, i.e. in the direction of the bottom 8, thus forming a rim 22 referred to hereinafter as the pusher. Note the presence on each bearing lug 4 of two slots 24 here extending transversely to the profile forming the central part 2. Each of these slots 24 is intended to receive the end of a screwdriver. They are used a priori only in the case of difficulty in fitting splice bars to cable tray sections.

The second lateral branch 12 is similar to the first lateral branch 10. It also has two notches 18 separated by a spacing lug 20. The notches 18 of the first and second lateral branches 10 and 12 are aligned transversely relative to the profiled central part 2.

Figure 6:
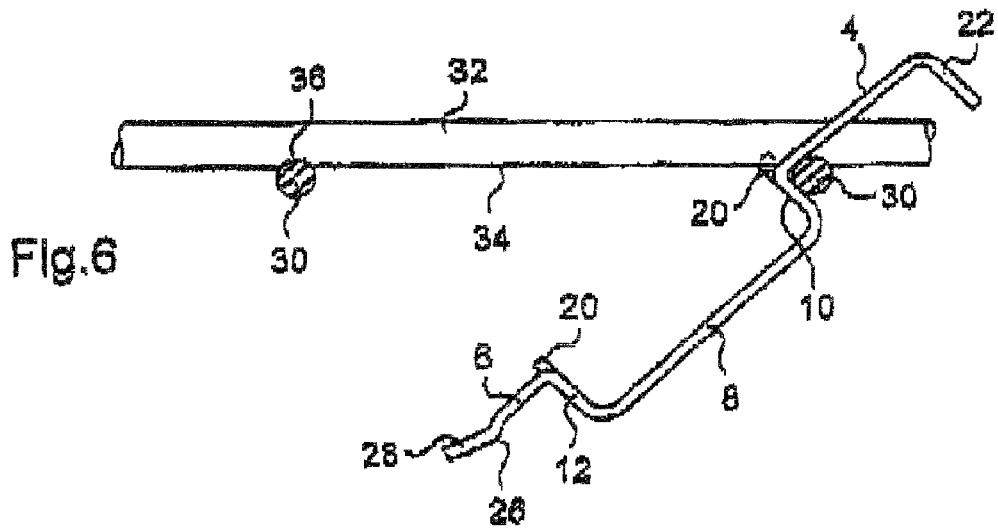
FIG. 6 is a view in section taken along the section line VII-VII in FIG. 5 when the splice bar is in the position represented in FIG. 2, and FIG. 7 corresponds to the FIG. 6 view, with the splice bar mounted as represented in FIGS. 4 and 5.
Figure 7:
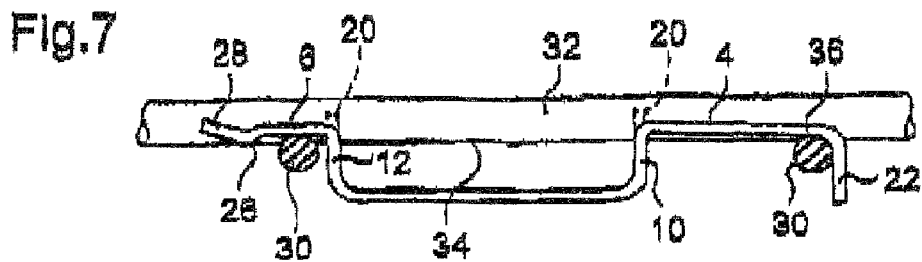

The second lateral branch 12 carries at both ends, on each side of the notches 18, the clipping lugs 6. Each of these clipping lugs 6 extends generally parallel to the bottom 8 toward the exterior of the profiled central part 2. FIGS. 6 and 7 show the shape of the clipping lugs 6. Note in these figures that, starting from the second lateral branch 12, each clipping lug 6 extends firstly toward the exterior of the profiled central part 2 in a plane substantially parallel to the bottom 8, and then forms a downward boss 26, i.e. a boss in the direction of the bottom 8, before terminating in an upwardly inclined end 28.

Figure 2:
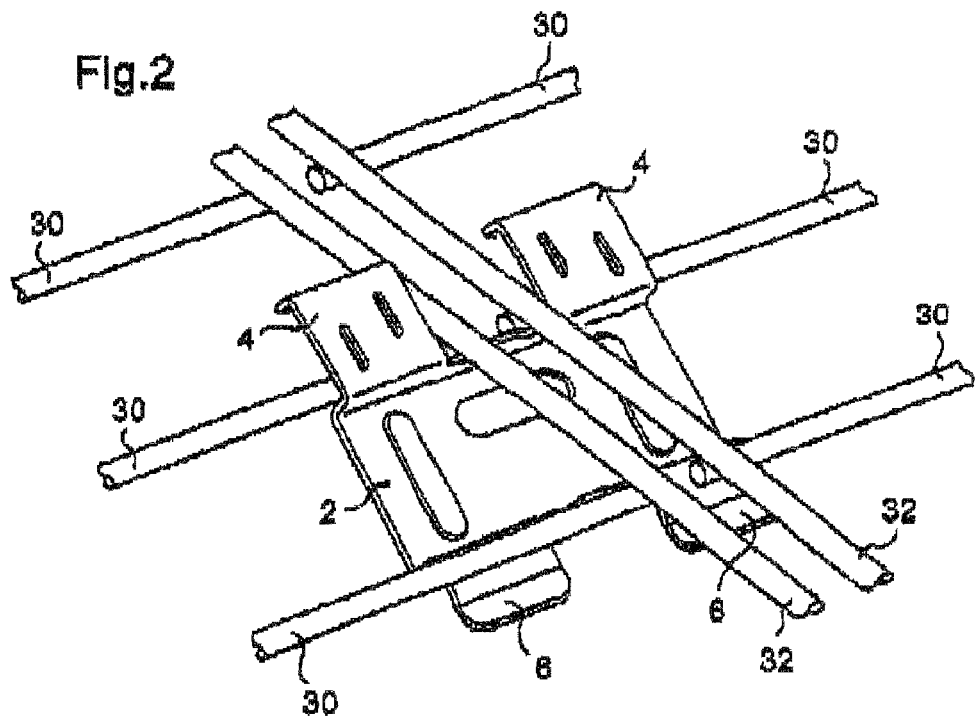
FIGS. 2 to 4 show, to a smaller scale than FIG. 1, three steps of splicing two cable tray sections using the splice bar from FIG. 1.
Figure 3:
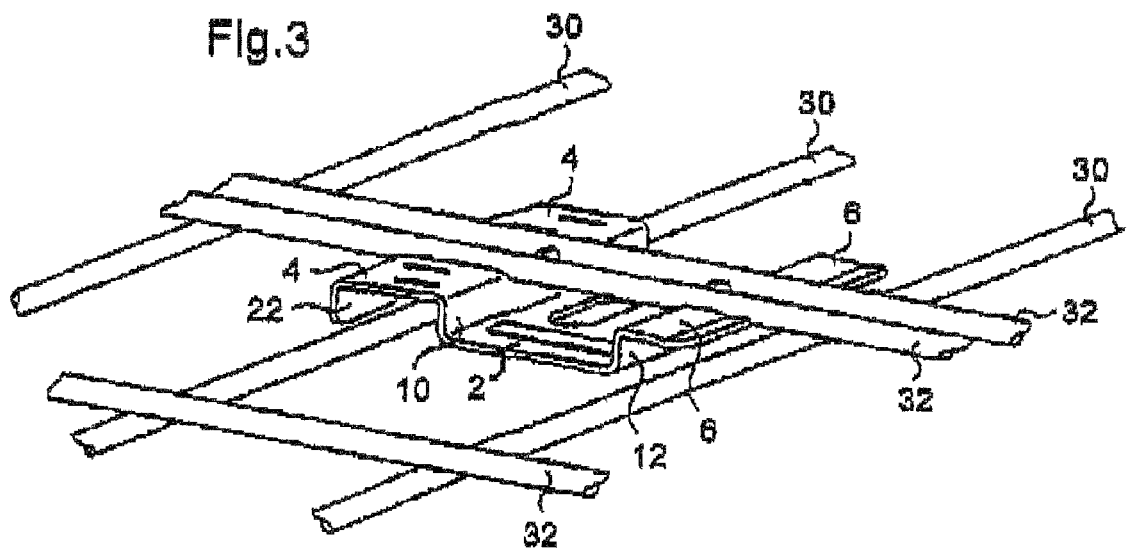
Figure 4:
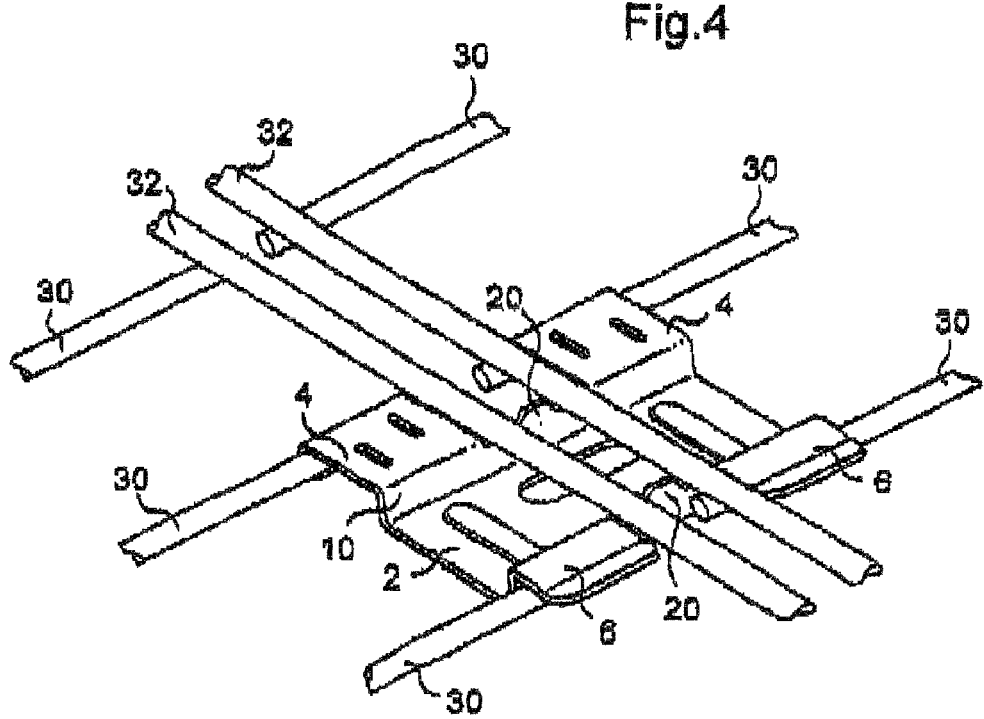

FIGS. 2 to 4 show the fitting of the splice bar from FIG. 1 to connect two cable tray sections. Here it is a question of a wire cable tray. Such cable trays are known to the person skilled in the art. They are made from warp wires 30 and weft wires 32. The warp wires 30 are longitudinal wires and the weft wires 32 have a U-shape and extend transversely relative to the warp wires 30. Thus a wire cable tray has in the conventional way a bottom and lateral flanges. In the appended drawings, only part of the bottom of the cable tray is shown. The splice bar from FIG. 1 has the particular feature of being particularly adapted to connect cable tray sections by being fixed to their bottom.

In the conventional way, two sections of cable tray to be connected are offered up to each other. Such sections each have an end weft wire 32 at their end.

FIG. 2 shows the first positioning of the splice bar relative to the cable tray sections aligned with each other. The bearing lugs 4 of the splice bar are disposed on either side of the end weft wires 32. The central part 2 of the splice bar is under the cable tray and the bearing lugs 4 are inside it. The plane of the bottom 8 of the central part 2 of the splice bar is inclined at approximately 45°, for example, to the bottom of the cable tray. The end weft wires 32 are located in the notches 18 in the first lateral branch 10.

In this position represented in FIG. 2, the exterior face of the first lateral branch 10 bears against a warp wire 30 of each cable tray section. The splice bar is then pivoted about the two warp wires 30 against which the exterior face of the first lateral branch 10 bears so as to become substantially parallel to the bottom of the cable tray. Here the distance between the first lateral branch 10 and the free end of the clipping lugs 6 must be less than the distance between two warp wires 30 in the bottom of the cable tray. FIG. 3 shows the pivoted position. Note that in this position the end weft wires 32 rest in the notches 18 of the first lateral branch 10 and the second lateral branch 12 and bear on the bottom of those notches 18.

To finish the connection, the bottom splice bar is slid along the end weft wires 32 so that the bosses 26 pass over the warp wires 30 adjacent the warp wires 30 against which the exterior face of the first lateral branch 10 was resting. The bearing lugs 4 rest on the warp wires 30 and bear on them so that the weft wires 32 rest on the bottom of the notches 18. This movement in translation can be effected easily by hand because of the pushers 22. In the event of difficulty in fitting, a screwdriver can be used by inserting its end into one of the slots 24 and levering against a warp wire.

Figure 5:
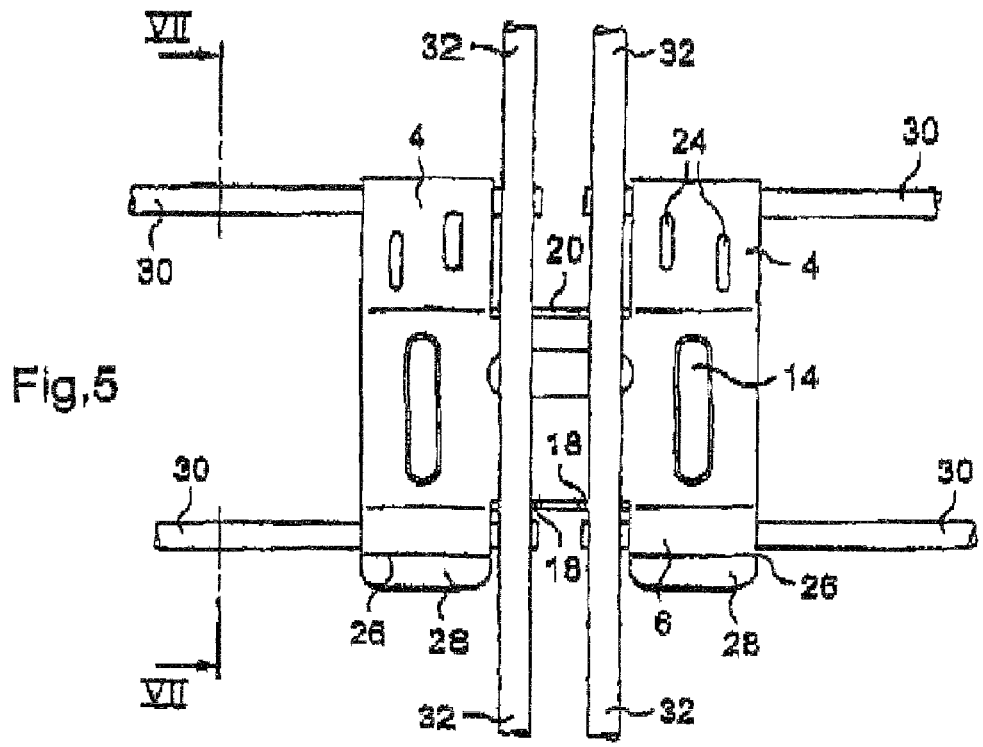
FIG. 5 represents a view from above of the splice bar from FIG. 1 mounted between two cable tray section ends.

FIGS. 4 and 5 show the splice bar from FIG. 1 in its fitted position connecting two cable tray sections. In this position, two warp wires 30 abut against the pushers 22 and two other warp wires 30 adjacent them are located between the second lateral branch 12 of the central part 2 and the bosses 26 of the corresponding clipping lugs 6.

Note in FIGS. 4 and 5, for example, that the width of the splice bar from FIG. 1, i.e. the dimension of this splice bar measured transversely to the profiled central part 2, is slightly greater than the distance between two adjacent warp wires at the bottom of the cable tray. The distance between the interior face of the pushers 22 oriented toward the central part 2 of the splice bar from the exterior face of the second lateral branch 12 is a few millimeters less than the distance between two adjacent warp wires 30 of the bottom of the cable tray.

FIG. 7 shows the bearing points of the splice bar from FIG. 1 when mounted on the warp wires 30, these bearing points holding the weft wires 32 pressed onto the bottom of the notches 18 serving as bearing areas and housings for these weft wires 32. Of course, the sides of the splice bar from FIG. 1 are adapted to the various cable trays to which this splice bar is to be fitted. Accordingly, for the splice bar to bear on the cable tray and thereby to ensure a perfect connection of two cable tray sections, the distance between the bottom of the notches 18 and the lower faces (i.e. the faces oriented toward the bottom 8 of the central part 2) of the bearing lugs 4 and clipping lugs 6 intended to come into contact with the warp wires 30 is slightly less in the idle position (FIGS. 1 to 3 and 6) to the vertical distance between the lower generatrix 34 of an end weft wire 32 and the upper generatrix 36 of a warp wire 30. This difference in height is substantially constant from one cable tray to another, even if the wires are of different diameters, and so the splice bar can be fitted to all cable trays (subject to the correct spacing between the warp wires).

The fitting of the splice bar is described hereinabove with reference to a cable tray bottom. It is nevertheless clear that this kind of splice bar can equally be used at the level of a lateral flange of a cable tray. Of course, the cable tray must then be such that at least two warp wires are present over the height of a lateral flange of the cable tray.

A splice bar as described hereinabove is used to connect and align two contiguous wire cable tray sections rigidly, very quickly and without using tools. This splice bar also has the advantage of being adaptable to cable trays using wires of different diameters. It suffices to provide notches wide enough to accommodate all types of wire usually employed to produce the weft wires of a cable tray.

A splice bar according to the invention is adapted to splicing cable tray sections carrying heavy loads.

The embodiments described have the advantage that they can be fitted easily and also removed easily because the splice bar is fitted without plastically deforming it.

The present invention is not limited to the preferred embodiment described above by way of nonlimiting example. It also concerns all embodiments that will be evident to the person skilled in the art.

The shape of the central part of the splice bar could therefore be different from the shape described. In a different embodiment, this central part could be a substantially plane plate with two troughs produced in it to receive the end welt wires of the cable tray sections to be connected. Bearing lugs and locking (or clipping) lugs substantially in the plane of the central part or slightly offset relative to that central part can then be envisaged.

The shape of the various components, such as the bearing lugs and the locking (or clipping) lugs, are given in the foregoing description by way of example only and are not limiting on the invention. For example, the presence of a pusher on the bearing lug is optional. Similarly, as emerges from the foregoing description, the slots in the bearing lugs are optional.

When locking is effected by clipping, the shape of the bosses an the clipping lugs could be different from that described. Instead of having a boss extending all along a line, there could be one or more localized bosses.

The splice bars described are locked by clipping then. It is nevertheless feasible, without departing from the scope of the invention, to lock a splice bar according to the invention onto a cable tray with the aid of a deformable locking tongue.

The invention claimed is:

1. A connecting splice bar for wire cable trays, for connecting two wire cable tray sections placed end-to-end, each cable tray section including longitudinal warp wires and transverse weft wires connecting the warp wires,
    said splice bar includes:
    an elongate central part having a substantially planar bottom and two transverse bearing areas each adapted to receive one weft wire,
    two substantially planar bearing lugs attached to the central part on the same side thereof and disposed on respective opposite sides of the transverse bearing areas, each of said bearing lugs being parallel to said flat bottom and being extended by a rim extending perpendicularly to a free end of each of said bearing lug, wherein said flat bottom and said rim define a surface adapted to bear against a first warp wire, and
    two substantially planar locking lugs attached to the central part on the side opposite the bearing lugs and disposed on the respective opposite sides of the transverse bearing areas, each of said locking lugs being substantially parallel to said flat bottom and including a resilient boss and a free end, said free end being inclined such that the boss is capable of passing over a second warp wire when slid in a direction parallel to an axis of the transverse bearing areas.

2. The connecting splice bar according to claim 1, wherein the elongate central part is a profiled area having a U-shaped cross section with said bottom and two lateral branches.

3. The connecting splice bar according to claim 2, wherein the transverse bearing areas consist of notches in the lateral branches.

4. The connecting splice bar according to claim 3, wherein the central part includes stiffener bosses.

5. The connecting splice bar according to claim 2, wherein the central part includes stiffener bosses.

6. The connecting splice bar according to claim 1, wherein the central part includes stiffener bosses.

7. The connecting splice bar according to claim 1, wherein the central part includes fixing means to receive an accessory.

8. The connecting splice bar according to claim 7, wherein the fixing means is an oblong hole.

9. The connecting splice bar according to claim 1, made by cutting and bending a galvanized steel plate.

\* \* \* \* \*